Figure 1:
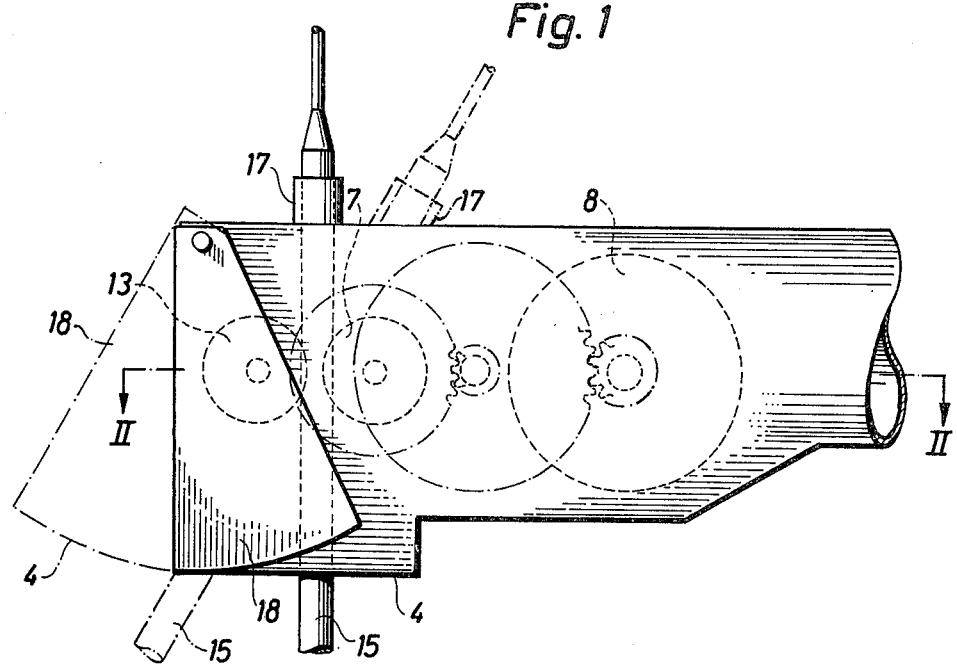

United States Patent [19]

Karlsson

[11] 3,882,300
[45] May 6, 1975

[54] MEANS IN WELDING TOOLS FOR WELDING WITH WELDING ELECTRODES AND MEANS FOR SMOKE REMOVAL

[76] Inventor: Jan Anders Rolf Karlsson, Liedbergsgatan 43, S-352 32 Vaxjo, Sweden

[22] Filed: Oct. 30, 1973

[21] Appl. No.: 411,077

[30] Foreign Application Priority Data
May 17, 1973   Sweden .............................. 7354264
Oct. 30, 1972   Sweden .............................. 5803/72

[52] U.S. Cl. ............. 219/130; 219/131 F; 219/136; 219/138
[51] Int. Cl. ........................................... B23k 9/12
[58] Field of Search .......... 219/130, 136, 75, 131 F, 219/138, 140, 144, 139, 141, 142, 143

[56] References Cited
UNITED STATES PATENTS

| | | | |
|---|---|---|---|
| 2,383,951 | 9/1945 | Bass | 219/138 |
| 3,514,567 | 5/1970 | Stuaug | 219/130 |
| 3,693,858 | 9/1972 | Auaya et al. | 219/130 |
| 3,707,616 | 12/1972 | Liudgvist | 219/136 |
| 3,775,587 | 11/1973 | Lindkrist | 219/130 |

*Primary Examiner*—Bruce A. Reynolds
*Attorney, Agent, or Firm*—Murray Schaffer

[57] ABSTRACT

A welding tool for welding using a consumable electrode, the welding tool comprising means for the removal of the welding smoke and means for feeding the welding electrode as it is consumed during welding.

8 Claims, 6 Drawing Figures

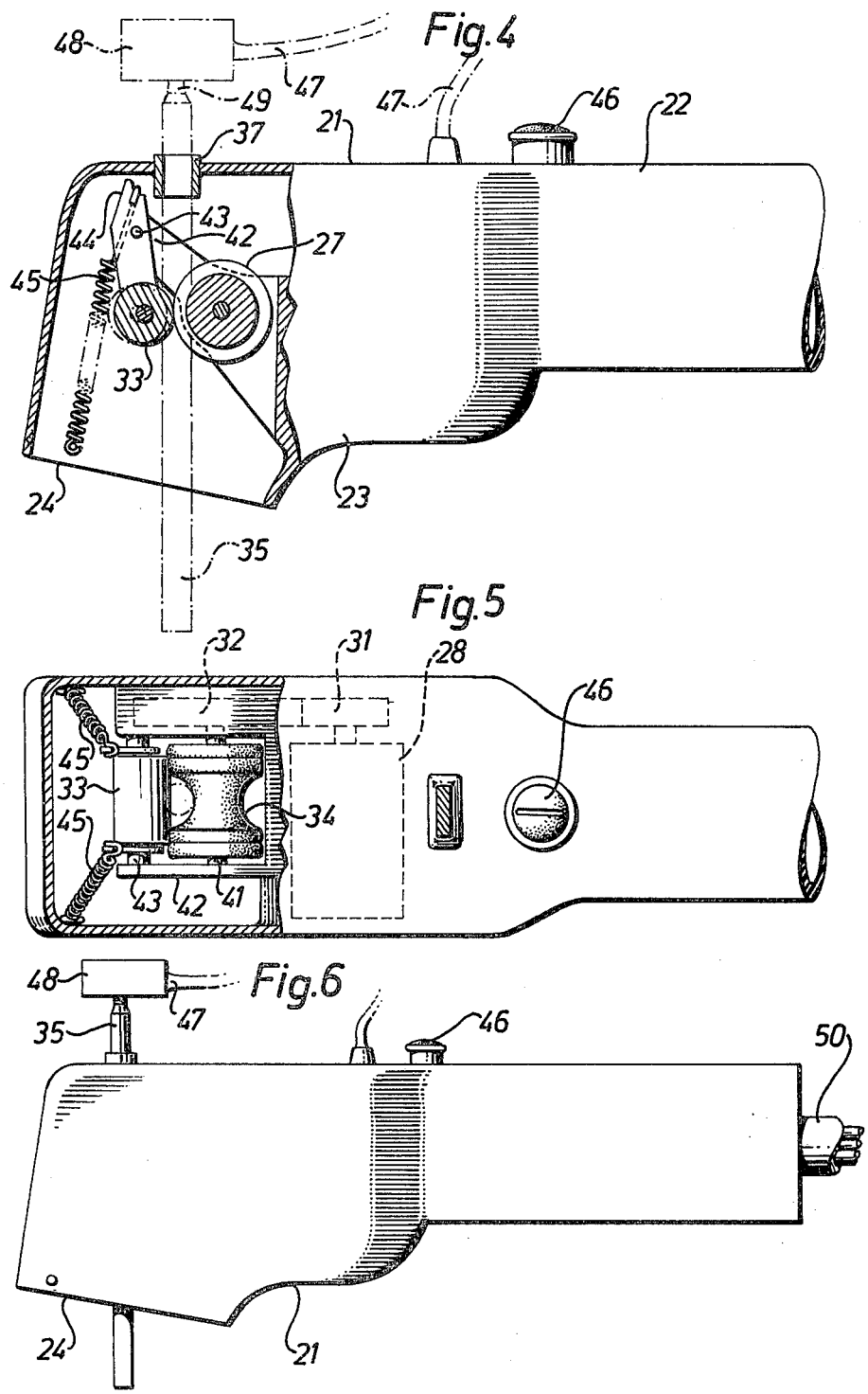

MEANS IN WELDING TOOLS FOR WELDING WITH WELDING ELECTRODES AND MEANS FOR SMOKE REMOVAL

The present invention relates to a means in welding tools for welding with welding electrodes.

When welding is being performed indoors, the welding gas which occurs during the welding becomes mixed with the rest of the air in the premises and usually causes considerable problems. To enable the welding to be continued, the entire volume of air in the premises has had to be changed several times an hour for fresh, heated air, resulting in high costs and inconvenience. It has often been impossible to weld using a welding electrode in limited spaces or passages. Even if the welding smoke formed would be drawn away from the welding spot via the welding tool, there are still problems since the welding electrode must be manually drawn forward as it is consumed, with the risk that the distance between the welding arc and the suction orifice will become too great and welding smoke is spread in the premises or the limited or narrow space. Furthermore, the manual drawing forward of the electrode causes undesirable interruptions in the welding process.

The present invention solves the above-mentioned problems in a satisfactory manner and enables welding to be performed in any premises as well as in narrow spaces, without the welding operation having to be interrupted to alter the position of the welding electrode in the welding tool and without risk of welding smoke being spread into the surroundings during the continuous welding process thus performed. This is achieved according to the invention in that a welding tool for welding using a consumable electrode comprises a casing which is provided with an opening for surrounding a welding electrode and facing a welding zone and connected to a suction conduit communicating with the opening for the removal of smoke produced during welding through the opening and means in the casing for feeding a welding electrode towards a welding zone as the electrode is consumed during welding. This ensures that the desired distance is maintained between the welding arc and the suction opening of the casing so that the welding smoke produced is drawn away through the suction conduit. The desired distance can of course be varied dependent, for example, on the suction effect being used.

According to a particular embodiment of the invention, the feeding means comprise two wheels, rollers or the like, journalled rotatably in the casing and engaging the electrode, at least one of which is driven, to enable controlled feeding forwards of the welding electrode held or received between the wheels.

Figure 2:
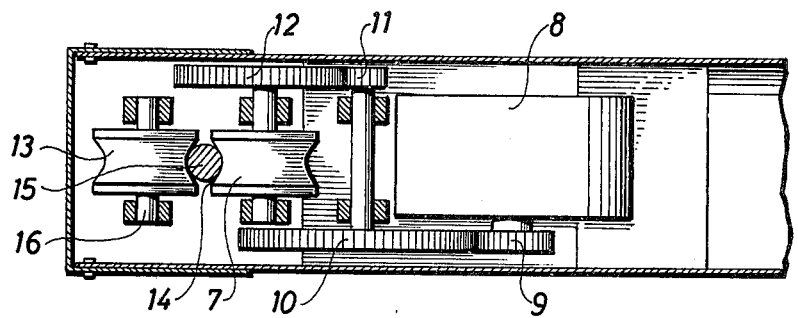
Figure 3:
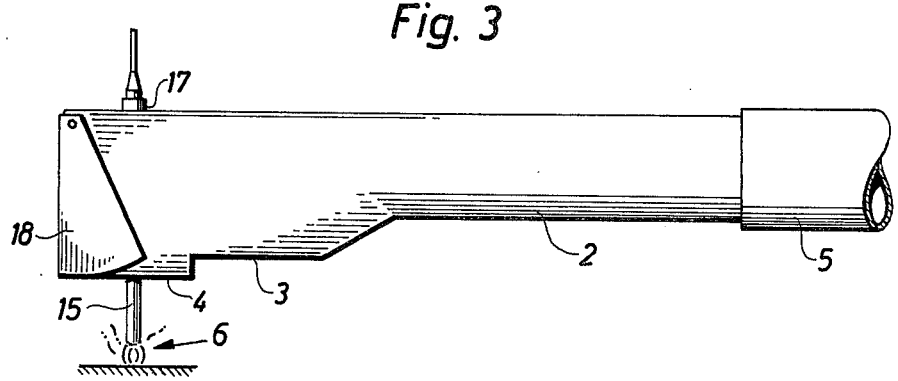

The invention is further described in the following, with reference to the accompanying drawings in which FIG. 1 shows a side view of a welding tool according to one embodiment of the invention, FIG. 2 is a section along the line II—II in FIG. 1, FIG. 3 shows the welding tool according to FIG. 1 with suction hose, FIG. 4 shows a side view of a welding tool according to another embodiment of the invention, the front part being shown in section, FIG. 5 shows the welding tool according to FIG. 4, seen from above with its upper side partially in section, and FIG. 6 shows the welding tool according to FIG. 4 with welding electrode and electric connection wires.

The welding tool shown in FIGS. 1 to 3 comprises a casing 1 having a narrower tube portion 2 serving as the handle at the rear end and a wider tube portion 3 at the front end, provided with an opening or orifice 4 directed substantially downwardly. The rear tube portion 2 of the casing is connected to a flexible hose 5 for withdrawal of the welding smoke produced at a welding spot 6, via the opening 4 and the inner space of the casing. The suction hose 5 is in turn connected to a suitable suction source, for example a central suction installation or a separate suction unit, which mey be arranged in or near a welding transformer, not shown.

Inside the casing there is a rotatable driving or feeding wheel 7, which is driven by a power source 8 via a number of toothed wheels 9, 10, 11 and 12 forming a gear transmission. A support wheel 13 is journalled rotatably in the vicinity of the feeding wheel 7 so that a welding electrode 15 can be received and fed forward between the wheels 7, 13 under friction interaction. One of the wheels 7, 13 or, as shown in FIG. 2, both the wheels may be provided with grooves 14 to position and guide the electrode. The support wheel 13 may suitably be springloaded so that it presses against the welding electrode 15 with a suitable spring force. Such spring-loading can be obtained, for example, by means of suitable spring elements as described in the following embodiment, or in some other suitable way, for example by spring elements arranged at or in the journalling points for the shaft 16 of the support wheel. The spring-loading of the support wheel 13 so that it can be moved to and from the feeding wheel 7 facilitates insertion of a new welding electrode between the wheels and enables the use of welding electrodes having varying diameters. The casing may also be provided with one or two guides 17 for the welding electrodes, so that in the latter case there is a choice between two positions for the feeding direction of the welding electrode, as shown in FIG. 1. In order to ensure satisfactory suction when welding is being performed with the electrode in the position indicated by dotted lines in FIG. 1, it may be suitable to provide the casing with an adjustable cover 18 by means of which the opening 4 can be enlarged or moved by swinging the cover out to the position indicated in dotted lines in FIG. 1.

The welding tool according to FIGS. 4 to 6 also comprises a casing 21 having a rear tube portion 22 and a front tube portion 23 and being provided with an opening or orifice 24 directed substantially downwardly. The rear tube portion of the case is intended to be connected to a flexible hose for withdrawal of welding smoke with the help of a suction source as described in connection with the first embodiment. The front tube portion of the casing also contains a driving or feeding wheel 27 which is driven by a power source 28 via a gear transmission comprising the two toothed wheels 31 and 32. A support wheel 33 is rotatably journalled near the feeding wheel 27 so that a welding electrode 35 can be received and fed forward between the wheels 27, 33 due to friction interaction. In this embodiment the feeding wheel 27 is provided with a groove 34 to give satisfactory positioning and guiding of the welding electrode. If desired the support wheel 33 may also be provided with a corresponding groove. The welding electrode is guided further to a guide 37 on the upper side of the casing. As can be seen more clearly in FIG. 5, the feeding wheel 27 is journalled with its shaft 41 in a fork 42 attached in the casing. At the free ends of this fork the support wheel 33 is pivotably suspended by means of a shaft pin 43 and two opposing bearing elements 44 which are extended upwardly from the pivoting centre of the support wheel formed by the shaft pin 43. The free end of each bearing element is connected to one end of a spring 45, the other end of the spring being attached to the inside of the casing in the vicinity of its opening 24. Due to these springs and this suspension of the support wheel 33, the support wheel will be spring loaded so that it presses against the welding electrode with the desired suitable spring force. Such a springloading facilitates insertion of a new electrode between the wheels 27 and 33, but is particularly advantageous since it enables the use of welding electrodes having different diameters.

In the embodiments shown, the power sources 8, 28 consist of an electric motor, the connection and disconnection of which is regulated by a switch 46 (not shown in the embodiment according to FIGS. 1 to 3) placed on the upper side of the casing. A connection wire 47 (not shown in FIGS. 1 to 3) leads from the casing, for example in the form of a metal cable provided with a contact head 48 for detachable connection to the contact end 49 of the welding electrode. The conductors 50 for the electric motor and for the connection wire of the welding electrode are preferably located in the suction conduit connected to the rear tube portion 2, 22 of the casing.

Any suitable source of power or driving means may be used to drive the feeding wheel 7, 27. Besides an electric motor, for example, a compressed air motor may be used, or a purely mechanical drive means. In the latter case a springloaded, finger-operated lever or the like may be arranged, for example on the lower side of the casing, for stepwise turning of the feeding wheel 7, 27, via suitable mechanical arrangements such as toothed wheels and link arms for transmitting movement. The omission of an electric motor is an advantage, particularly as this enables the welding tool to be used in areas or premises where high voltages are forbidden. At least the drive or feed wheel 7, 27, may be provided with a rubber coating or the like in order to increase the friction against the electrode.

The invention is not limited to the embodiments described or suggested above, but can be varied and modified in many different ways within the scope of the following claims. Thus, "means to feed the welding electrode in steps or continuously" covers also at least one electromagnet which can suitably be arranged in the opening 4, 24 of the casing to influence the welding electrode so that this is fed towards the welding spot, the welding electrode being retarded when feeding is not desired, with the help of a finger-operated braking means, for example, built in to the casing, which locks the welding electrode with the necessary friction force in a controllable manner. The electromagnet may, for example, be designed to surround the welding electrode and is preferably magnetized by the welding current, i.e. by the same current which is used for the welding process itself.

What I claim is:

1. A welding tool comprising a consumable rod electrode having a working end and a contact end, a hollow casing directly surrounding said electrode and having an opening adapted to face a welding zone, means for supporting said electrode within said casing and for selectively feeding said electrode to present the working end of said electrode toward said opening as said electrode is consumed, means for connecting the contact end of said electrode to a source of current and a conduit connected to said casing and communicating with its interior leading to a source off suction for removal of smoke produced during welding from about said electrode.

2. A welding tool according to claim 1 wherein the feeding means comprises a pair of opposed rotatable elements journaled in said casing and spaced to receive said electrode therebetween and means for rotating at least one of said elements to thereby move said electrode.

3. The welding tool according to claim 2 wherein said driving means is located within said casing and includes means for selectively acutating said driving means for transmitting a continuous or indexing movement to said electrode.

4. The welding tool according to claim 3 wherein said driving means is an electric motor.

5. The welding tool according to claim 3 wherein said driving means is a pneumatic motor.

6. The welding tool according to claim 2 wherein at least one of said rotatable elements is pivotally mounted and is provided with a spring for resiliently biasing said element against its oppositely paired element.

7. A welding tool according to claim 1 wherein said means for supporting said electrode includes at least one guide member located in said casing opposite said opening and maintaining said electrode in a defined pair with respect to said opening.

8. The weldidng tool according to claim 1 wherein said casing includes an adjustable portion for varying the size of said opening.

* * * * *